United States Patent
Hertling et al.

(10) Patent No.: US 11,884,018 B2
(45) Date of Patent: Jan. 30, 2024

(54) FINISHING THREE-DIMENSIONAL PRINTED PARTS

(71) Applicant: HEWLETT-PACKARD DEVELOPMENT COMPANY, L.P., Spring, TX (US)

(72) Inventors: William E Hertling, Vancouver, WA (US); Jeffrey Porter, Sunnyvale, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/605,549

(22) PCT Filed: Apr. 11, 2018

(86) PCT No.: PCT/US2018/027067
§ 371 (c)(1),
(2) Date: Oct. 16, 2019

(87) PCT Pub. No.: WO2019/152064
PCT Pub. Date: Aug. 8, 2019

(65) Prior Publication Data
US 2020/0122391 A1 Apr. 23, 2020

Related U.S. Application Data (63) Continuation-in-part of application No. PCT/US2018/016273, filed on Jan. 31, 2018.

(51) Int. Cl.
*B29C 64/393* (2017.01)
*B29C 64/30* (2017.01)
(Continued)

(52) U.S. Cl.
CPC .............. *B29C 64/30* (2017.08); *B22F 10/39* (2021.01); *B22F 10/62* (2021.01); *B22F 10/66* (2021.01); *B29C 64/188* (2017.08); *B29C 64/209* (2017.08); *B29C 64/379* (2017.08); *B29C 64/393* (2017.08); *B33Y 30/00* (2014.12);
(Continued)

(58) Field of Classification Search
CPC ........ B29C 64/188–194; B29C 64/379; B33Y 40/00; B33Y 40/20
See application file for complete search history.

(56) References Cited

U.S. PATENT DOCUMENTS

| 5,443,412 A | 8/1995 | Yoshikawa et al. |
| 9,144,926 B2 | 9/2015 | Yokota |

(Continued)

FOREIGN PATENT DOCUMENTS

| CN | 101578169 A | 11/2009 |
| CN | 105082412 A | 11/2015 |

(Continued)

*Primary Examiner* — Matthew J Daniels
*Assistant Examiner* — Andrew L Swanson
(74) *Attorney, Agent, or Firm* — Michael Dryja (57) ABSTRACT

Examples disclosed herein relate to a finishing system for a three-dimensional (3D) printed part. Example systems include a sensor to detect a marking on a portion of the 3D printed part. A post-processing component of the system may perform a finishing operation on the portion of the 3D printed part while the marking is detected on the 3D printed part.

12 Claims, 4 Drawing Sheets

(51) Int. Cl.
    *B33Y 30/00*       (2015.01)
    *B29C 64/379*     (2017.01)
    *B29C 64/188*     (2017.01)
    *B29C 64/209*     (2017.01)
    *B33Y 40/20*       (2020.01)
    *G06T 17/10*       (2006.01)
    *B22F 10/39*       (2021.01)
    *B22F 10/62*       (2021.01)
    *B22F 10/66*       (2021.01)
    B33Y 10/00       (2015.01)
    B33Y 50/02       (2015.01)

(52) U.S. Cl.
    CPC .............. *B33Y 40/20* (2020.01); *G06T 17/10* (2013.01); *B33Y 10/00* (2014.12); *B33Y 50/02* (2014.12)

(56) References Cited

U.S. PATENT DOCUMENTS

| | | |
|---|---|---|
| 2006/0236738 A1 | 10/2006 | Indlekofer |
| 2007/0076234 A1 | 4/2007 | Hopper et al. |
| 2008/0169585 A1 | 7/2008 | Zinniel |
| 2009/0296981 A1 | 12/2009 | Mestha et al. |
| 2011/0117268 A1* | 5/2011 | Batchelder ............ B29C 64/106 427/8 |
| 2011/0300388 A1 | 12/2011 | Yokota |
| 2012/0203365 A1* | 8/2012 | Hummeler ............ B28B 1/001 700/98 |
| 2014/0117588 A1 | 5/2014 | Schindler et al. |
| 2014/0178588 A1 | 6/2014 | Swanson et al. |
| 2014/0271221 A1* | 9/2014 | Soucy .................... B33Y 10/00 264/157 |
| 2015/0096717 A1 | 4/2015 | Bachelder et al. |
| 2015/0142153 A1 | 5/2015 | Chun et al. |
| 2015/0266158 A1 | 9/2015 | Summers et al. |
| 2016/0067916 A1 | 3/2016 | Hirata et al. |
| 2016/0193791 A1* | 7/2016 | Swanson ................ B29C 64/40 264/408 |
| 2016/0311184 A1 | 10/2016 | Gourraud |
| 2016/0375676 A1 | 12/2016 | Ritchie et al. |
| 2017/0087772 A1 | 3/2017 | Hakkaku |
| 2017/0210063 A1 | 7/2017 | Andres et al. |
| 2017/0239893 A1 | 8/2017 | Hoover et al. |
| 2017/0252974 A1 | 9/2017 | Ng et al. |
| 2017/0259507 A1* | 9/2017 | Hocker ................ B29C 64/245 |
| 2017/0326867 A1* | 11/2017 | Hartke .................. B33Y 10/00 |
| 2018/0001553 A1 | 1/2018 | Buller et al. |
| 2018/0154581 A1* | 6/2018 | Dentinger ............ B29C 64/118 |
| 2018/0284725 A1 | 10/2018 | Garcia et al. |
| 2019/0134911 A1* | 5/2019 | Jones .................... B29C 64/153 |
| 2019/0217532 A1* | 7/2019 | Schroeder ............ B29C 64/393 |
| 2019/0270248 A1* | 9/2019 | Hutchinson ............ B24B 49/14 |

FOREIGN PATENT DOCUMENTS

| | | |
|---|---|---|
| CN | 105773966 A | 7/2016 |
| CN | 106002642 A | 10/2016 |
| CN | 106965435 A | 7/2017 |
| CN | 107206685 A | 9/2017 |
| CN | 107580544 A | 1/2018 |
| DE | 4122980 A1 | 1/1993 |
| DE | 102005030710 A1 | 1/2007 |
| TW | 201706116 A | 2/2017 |
| WO | 2015/077256 A1 | 5/2015 |
| WO | WO2015130401 A2 | 9/2015 |

\* cited by examiner

FINISHING THREE-DIMENSIONAL PRINTED PARTS

RELATED APPLICATIONS

The present patent application is related to U.S. patent application Ser. No. 16/605,375, filed on Oct. 15, 2019, and which is now abandoned.

BACKGROUND

Three-dimensional (3D) printed parts that have been manufactured using an additive manufacturing process may be subjected to a post-processing or a finishing process. Such finishing processes may be performed on the manufactured 3D printed part after the additive manufacturing process is completed to modify an aspect of the 3D printed part to produce a final 3D object.

BRIEF DESCRIPTION OF THE DRAWINGS

The following detailed description references the drawings, wherein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

When designing and manufacturing 3D printed parts a variety of physical characteristics may be sought for the design of a final 3D printed part. For example, the final 3D printed part may include different colors, surface textures, etc. In order to finalize the 3D printed part, in some examples, the 3D printed part may be processed (i.e., "post-processed") by separate device from or component of an additive manufacturing system used to build the 3D printed part. In such examples, post-processing may remove build material from the 3D printed part. For examples, the build material to be removed may be surface imperfections resulting from the additive manufacturing process, support material formed with the part to provide structural support during the manufacturing process, etc. In other such examples, post-processing may add material to the 3D printed part. For example, the material to be added may be a coating such as a gloss, TEFLON®, etc.

In examples, 3D printed parts may be provided to a post-processing system after manufacturing. As used herein, a "3D printed part," "3D part," or a "part," refers to a physical object manufactured using an additive manufacturing process, such as, a 3D printer. As used herein, "post-processing" refers to a process that occurs after a 3D printed part is manufactured. A "post-processing system" may be any system to perform a finishing operation or finishing process on the 3D printed part. In some examples, the post-processing system may be a component of device to perform an additive manufacturing process. In other examples, the post-processing system may be separate from the device to perform the additive manufacturing process. As used herein, a "finishing operation," "finishing process," "finishing," or "to finish" a part may refer to any operation that may alter the physical appearance or characteristic of a part. For example, the removal of excess build material or the addition of extra material to a part may alter the part's shape, texture, or color, among other physical characteristics. In some examples, a post-processing system may perform multiple different finishing operations on a single part, such as removing different amounts of excess build material from different portions of the 3D printed part and adding layers to some portions of the 3D printed part. A number of post-processing systems may ask an operator to know what the final 3D printed part and final finish of the 3D printed part should look like and make dynamic and real-time decisions about where and how much of a finishing operation to apply, which may ask for skill and attention by a highly trained operator. However, automated or partially automated post-processing systems for finishing may not be able to make such dynamic decisions. For example, a post-processing system may simply process all portions of a 3D printed part for a preset amount of time, which may not be ideal for all surfaces on the part.

To address these concerns, an automated or partially automated post-processing system is described which may detect a marking on a 3D printed part and determine a finishing operation to apply to the 3D printed part until the marking is no longer detected. In such examples, the 3D printed part may be built with markings on some portion of the 3D printed part to indicate a finishing operation to be performed on that portion of the 3D printed part. In examples, a post-processing system may include a sensor to detect the marking and a component to perform a finishing operation corresponding to the marking.

Figure 1A:
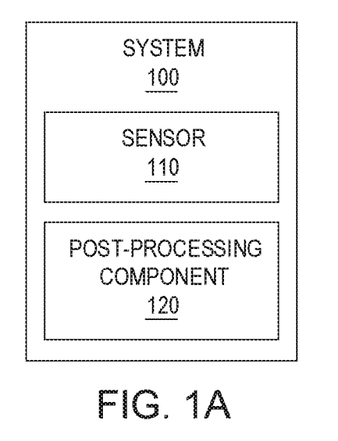
FIG. 1A is a block diagram of an example finishing.

Referring now to the drawings, FIG. 1A is a block diagram of an example system 100. In examples, system 100 may include a sensor 110 and a post-processing component 120. In examples, system 100 may be any finishing system for a 3D printed part. In examples, systems 100 may receive a 3D printed part including marking(s) to be finished.

In examples, sensor 110 may be any type of sensor to detect a marking on a portion of a 3D printed part. As used herein, a "marking" refers to a physical characteristic or physical property applied to or incorporated into a layer of a 3D printed part. A marking may be a physical characteristic or physical property that distinguishes the layer(s), or a portion of a layer, into which it is incorporated from other layers, or other portions of layers, of the 3D printed part. In some examples, the marking may be a non-visible marking. For examples, this physical characteristic or physical property may be a fluorescent color that appears under ultraviolet (UV) light, a UV or near infrared (IR) color outside the normal visible spectrum, or a different level of magnetism compared to the magnetism of other portions of the 3D printed part. In other examples, the markings may be a visible marking, such as a color in the visible spectrum, a surface texture, etc. In some example, a 3D printed part may include multiple markings thereon. In one such example, the multiple markings may be disposed on different locations of the outer surface of the 3D printed part. In some examples, the marking may be incorporated into an outer layer(s) of the 3D printed part. In other examples, a 3D printed part may include multiple different markings on different layers of the 3D printed part disposed on corresponding locations of the 3D printed part. In some examples, the marking may have any shape and/or thickness. For example, the portion of the 3D printed part containing the marking may have a non-uniform thickness.

In one example, the markings may be printed with a fluorescent color that has the same visible color as the underlying portion of the 3D printed part when viewed under normal white light. As used herein, normal white light may be light having widely dispersed wavelengths predominantly in the visible spectrum of 390-700 nm. When the fluorescent color in the marking is viewed under UV light, the color fluoresces and produces a color having a distinctly greater brightness than the non-fluorescent color of the underlying portion of the 3D printed part. As used herein, UV light may be light having wavelengths predominantly in the UV spectrum of 10-400 nm. Thus, under white light, the marking is not visibly distinct from the underlying portions of the 3D printed part. However, under UV light, the markings appear with a visually distinctive brightness. As noted, the markings may also be formed using a color that appears visually the same color as the underlying 3D printed part's color, but which also includes a reflective UV or IR color component. As used herein, IR colors are those having wavelengths predominantly in the IR spectrum of 700-1,000 nm.

In examples, sensor 110 may be an optical sensor to detect a wavelength of light from the 3D printed part. In some such examples, the optical sensor may detect multiple wavelengths of light from the 3D printed part. For example, the optical sensor may detect both visible wavelengths of light and non-visible wavelengths of light from the 3D printed part. For example, image sensors manufactured using a charge-coupled device (CCD) or a complimentary metal-oxide semiconductor (CMOS) device are able to sense colors in a range of wavelengths from 350 nm to 1,000 nm (which includes both UV and IR light). In other examples, sensor 110 may be a sensor to detect a specific wavelength range of light from the surface of a 3D printed part. For example, sensor 110 may be an UV sensor to detect wavelengths of light in the UV spectrum.

In other examples, sensor 110 may be an image sensor, such as a camera or video recorder, to monitor a 3D printed part. In some such examples, the image sensor may monitor the 3D printed part for visible markings such as a textured surface, a color in the visible spectrum, etc. In examples, system 100 may include hardware and/or processing resources to recognize, interpret, and/or respond to markings seen via the image sensor.

In yet other examples, sensor 110 may be a magnetic sensor to detect a magnetic field. In some examples, the magnetic sensor may detect the strength and direction of a magnetic field generated by the 3D printed part. In one such example, a 3D printed part may be manufactured with a magnetized layer(s). For example, a small number of magnetic particles may have been added to the build material of a layer in the additive manufacturing process. In other examples, the magnetic property may be an inherent property of the material used in the additive manufacturing process. In yet further examples, the magnetic property may have been supplied to the 3D printed part during the additive manufacturing process via a fusing agent, other build components, or by other means.

In some examples, sensor 110 may be disposed to face a portion of the 3D printed part and detect marking(s) on that portion of the 3D printed part. In such an example, the 3D printed part may be moved, transported, rotated, etc. when sensor 110 does not detect a marking on the portion of the 3D printed part facing the sensor such that sensor 110 may detect markings on a different portion of the 3D printed part. For example, a 3D printed part may be mounted on a three-axis gimbal which may be controlled by system 100. In other examples, sensor 110 may be mounted on a movement subsystem to be moved relative to the 3D printed part disposed in system 100. In examples, sensor 110 may include multiple sensing components to detect different types of markings. For example, sensor 110 may include an optical sensor and a magnetic sensor.

In some examples, sensor 110 may detect a location of the marking on the 3D printed part relative to post-processing component 120. For example, the marking may be disposed on a portion of the outer surface of a 3D printed part. In such an example, sensor 110 may determine the location of the marking on the 3D printed part relative to post-processing component 120 when detecting the marking. For example, sensor 110 may directly measure the distance and angle between the marking and post-processing component 120. In other examples, sensor 110 may measure the distance and angle between the marking and any other component of system 100. As will be appreciated, in such an example, the distance and angle between the other component and post-processing component 120 may be known or measured to determine the relative location of the marking of the 3D printed part. In examples, system 100 may include any hardware and/or processing resource to determine the location of the marking detected by sensor 110 relative to post-processing component 120. For example, system 100 may include a processing resource to determine the location of a detected magnetic field according to the strength and direction of the magnetic field detected by a sensor.

In some examples, sensor 110 may detect a dimension of the marking on the 3D printed part. For example, the marking may be disposed on a portion of the outer surface of a 3D printed part. In such an example, sensor 110 may determine the dimensions of the marking on the 3D printed part when detecting the marking. In other examples, system 100 may include any hardware and/or processing resource to determine the dimensions of the marking detected by sensor 110. For example, system 100 may include a processing resource to determine the dimensions of a detected magnetic field according to the strength and direction of the magnetic field detected by a sensor.

In an example, sensor 110 may be disposed to sense a region of a 3D printed part facing post-processing component 120. In one such example, sensor 110 may detect a region of the 3D printed part facing post-processing component 120 with a substantially similar size as an effective area of the post-processing component 120. An effective area of a post-processing component refers to a minimum size of the area of a 3D printed part that the post-processing component may perform a finishing operation on. For example, a post-processing component may include a nozzle to eject a fluid towards a 3D printed part. For example, the fluid may be a combination of air and sand for a bead blasting operation. In examples, the effective area refers to the smallest cross-sectional size of an output ejected from the nozzle that may contact the 3D printed part. In other words, the effective area is the cross-sectional size of a fluid touching the 3D printed part. As will be appreciated, the cross-sectional size is related to the distance from the nozzle to the 3D printed part. For example, a post-processing component 120 may have an effective area of 2 millimeter (mm)×2 mm and sensor 110 may be disposed to detect a marking on the 2 mm×2 mm portion of the 3D printed part facing the nozzle. In other examples, sensor 110 may be disposed to detect a region of the 3D printed part with a larger size than the effective area of post-processing component 120. In yet another example, sensor 110 may be disposed to detect a region of the 3D printed part with a smaller size than the effective area of post-processing component 120. As will be appreciated, regardless of the size of a region detected by sensor 110, sensor 110 and/or the 3D printed part may be moved relative to each other to sense other regions, areas, or portions of the 3D printed part.

In examples, in operation, system 100 may include a bead blasting machine and an image sensor which continuously detects an image of the surface of the 3D printed part at the point where the stream of beads impacts the surface. The bead blasting operation continues at this location on the 3D printed part until the sensed image no longer contains a marking (e.g., an IR color), whereupon the 3D printed part may be rotated on the gimbal mount to a new location that does contain a marking. When the marking(s) is no longer detected by the image sensor, post-processing is complete. In the examples described herein, it will be understood that sensor 110 may no longer detect the marking or fail to detect the marking when the marking has been removed or obscured from the portion of a 3D printed part being sensed by sensor 110. In yet other examples, system 100 may determine sensor 110 is no longer detecting the marking when a strength of the detected marking falls below a certain threshold.

In examples, post-processing component 120 may be a component to perform a finishing operation. In examples, post-processing component 120 may perform a finishing operation on a portion of a 3D printed part according to markings on the 3D printed part. In examples, system 100 may determine or associate a finishing operation with a detected marking. In examples, system 100 may determine a marking is associated with a removal operation according to parameters or criteria stored thereon or provided thereto. In examples, systems 100 may receive information, parameters, or criteria associating a marking with a finishing operation from a remote device or system. In such examples, system 100 may include a communication unit or communication components to communicate with a remote device or remote system. In other examples, systems 100 may receive information, parameters, or criteria associating a marking with a finishing operation from a user interface coupled thereto. In such an example, system 100 may include any hardware and/or processing resource to receive information via a user interface.

In examples, post-processing component 120 may be any type of electrical component, mechanical component, or combinations thereof to perform a finishing operation or finishing process. For example, the operation may be a chemical bath deposition operation to add material to a 3D printed part and may include mechanical structures to hold a solution and substrate mounting device to hold the 3D printed part. In examples, a finishing operation may be a removal operation to remove a layer(s) of material from a 3D printed part. As used herein, a "removal operation" may be any finishing operation which results in the removal of a layer of material from the 3D printed part. In other words, a removal operation may remove the portion of the 3D printed part containing the marking or the remove the marking from the 3D printed part. For example, removing a layer of material may include sanding the 3D printed part to change a surface roughness of the 3D printed part. In other examples, a bead blasting machine may be used to ablate material layers from a 3D printed part. A bead blasting machine may be a device to bead blast an exterior surface of a part using a pressurized fluid, such as air or other fluids containing small, abrasive particles or beads. In other examples, a finishing operation or finishing process may include adding a layer of material to a 3D printed part. For example, adding a layer of material may include adding a coating, such as a gloss or protective material (e.g., TEFLON®). In examples, post-processing component 120 may include multiple finishing components to perform different finishing operations.

In an example, a finishing component may include a nozzle(s) to eject a fluid towards the 3D printed part. In some examples, the nozzle may eject a pressurized fluid, such as air or other fluids containing abrasive particles or beads to remove a layer of material from the 3D printed part. In other examples, the nozzles may eject a coating to be deposited on a portion of the 3D printed part containing the marking. In other words, additional material layers may be deposited on the marking by the nozzles. In yet another example, a finishing component may include a nozzle(s) to deliver a chemical to remove a material layer from the 3D printed part, such as an acid, a base, etc. In such an example, the portion of the 3D printed part including the marking may be composed of a different build material from a build material of the underlying 3D printed part. For example, the portion of the 3D printed part including the marking may be composed of a different build material which may be removed when exposed to a specific chemical without altering or removing the underlying build material of the 3D printed part. In operation, the 3D printed part may be disposed such that sensor 110 may detect a marking on a portion of a 3D printed part facing any nozzle(s) of the post-processing component. In one such example, system 100 may move the 3D printed part relative to a nozzle when markings are no longer detected. For example, system 100 may move the nozzle to face a different location on the 3D printed part, move the 3D printed part, and combinations thereof. In other examples, a finishing component may include mechanisms without nozzles to remove a material layer from the 3D printed part. For example, a finishing component may be a sander, a saw, a laser, etc. to remove a layer from the 3D printed part.

In examples, post-processing component 120 may automatically or semi-automatically perform a finishing operation, such as a removal operation or a material deposition operation, in response to detection of markings. For example, the post-processing component 120 may be fully automated thereby avoiding the use of an operator to perform the finishing process. In another example, an operator may control post-processing component 120 according to instructions received from system 100, such as a duration and/or intensity for performing finishing at a specific location on the 3D printed part. For example, system 100 may provide instructions to a user to perform a removal operation using a bead blaster as the post-processing component. In such examples, system 100 may provide instructions regarding a specific intensity of blasting to be performed at a specific location on the 3D printed part for a specific duration of time. In another example, post-processing component 120 may be nozzles to deposit additional layers of material on the marking. In such an example, system 100 may provide instructions regarding a specific duration of time a material deposition operation is to be performed at a specific location on the 3D printed part.

In examples, post-processing component 120 may perform the finishing operation on a portion of the 3D printed part including the marking detected by sensor 110. In examples, post-processing component 120 performs the finishing operation for as long as sensor 110 detects the marking. As will be appreciated, a duration of the finishing operation of the portion of the 3D printed part containing the marking may vary according to detection of the marking on the 3D printed part. In such examples, the detection of the marking(s) by sensor 110 may guide the finishing operation. For examples, the post-processing component 120 may be a sander to perform a sanding operation on a portion of the 3D printed part including the marking for a 30 second duration in which the marking is detected by sensor 110. Thereafter, in such an example, system 100 may move the 3D printed part such that a different portion of the part is facing the sander and perform a sanding operation for a duration of 15 seconds thereon in which the marking is detected by sensor 110. In another example, the 3D printed part may include a different marking under a layer of material removed by the sander and system 100 may control another post-processing component to perform a different post-processing step at the same location from which the layer of material was removed on the 3D printed part.

Figure 1B:
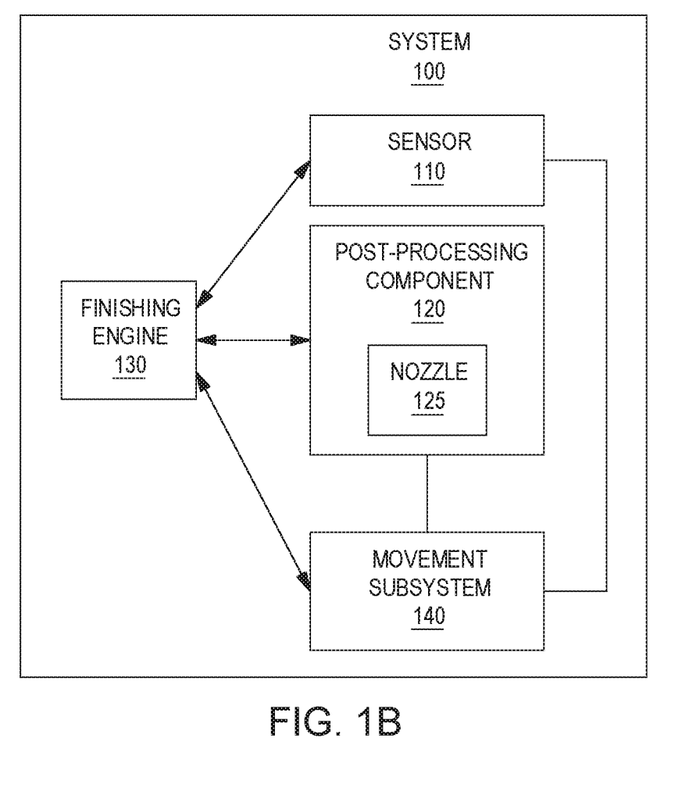
FIG. 1B is a block diagram of an example finishing system including possible additional example components of the system of FIG. 1A.

FIG. 1B is a block diagram of an example finishing system including possible additional example components of the system 100 of FIG. 1A. Additional components may include a finishing engine 130, movement subsystem 140, and a nozzle 125.

In examples, finishing engine 130 may be any combination of hardware and programming to implement the functionalities of the engine. In examples described herein, such combinations of hardware and programming may be implemented in a number of different ways. For example, the programming for the engines may be processor executable instructions stored on a non-transitory machine-readable storage medium and the hardware for the engine may include a processing resource to execute those instructions. In such examples, the machine-readable storage medium may store instructions that, when executed by the processing resource, implement engine 130. In such examples, system 100 may include the machine-readable storage medium storing the instructions and the processing resource to execute the instructions, or the machine-readable storage medium may be separate but accessible to system 100 and the processing resource.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

In some examples, the instructions can be part of an installation package that, when installed, can be executed by the processing resource to implement at least engine 130. In such examples, the machine-readable storage medium may be a portable medium, such as a CD, DVD, or flash drive, or a memory maintained by a computing device from which the installation package can be downloaded and installed. In other examples, the instructions may be part of an application, applications, component, or components already installed on system 100 including the processing resource. In such examples, the machine-readable storage medium may include memory such as a hard drive, solid state drive, or the like. In other examples, the functionalities of engine 130 may be implemented in the form of electronic circuitry.

In the example of FIG. 1B, finishing engine 130 may determine or associate a finishing operation with a detected marking. In examples, finishing engine 130 may determine a marking is associated with a removal operation according to parameters, information, or criteria stored in system 100 or provided to system 100. In examples, finishing engine 130 may receive information, parameters, or criteria associating a marking with a finishing operation from a remote device or system. In other examples, systems 100 may receive information, parameters, or criteria associating a marking with a finishing operation from a user interface coupled thereto. In an example, finishing engine 130 may receive information, parameters, or criteria to determine when sensor 110 is no longer detecting a marking. For example, finishing engine 130 may determine sensor 110 is no longer detecting the marking when a strength of the detected marking falls below a certain threshold.

In an example, finishing engine 130 may associate an IR marking within a specific wavelength range with a material deposition operation. In such an example, the material deposition operation may include a specific thickness of the material to be deposited onto the portion of the 3D printed part including the marking. In one such example, finishing engine 130 may control post-processing component 120 to deposit the material until the specified thickness is achieved regardless of continued detection of the marking by sensor 110. In another such examples, finishing engine 130 may control post-processing component 120 to deposit the material until sensor 110 detects a strength of the IR marking is below a certain threshold. In such an example, the threshold may correspond to a signal strength expected to be reached when a material deposition operation has deposited the specific thickness. In other words, the IR marking may still be detectable at a point at which the material deposition operation should be ceased and finishing engine 130 may control post-processing component 120 to cease operation at this point.

In examples, movement subsystem 140 may move sensor 110 relative to the 3D printed part. In other examples, the movement subsystem 140 may move the post-processing component 120 relative to the 3D printed part. In yet another example, movement subsystem 140 may move sensor 110, post-processing component 120, and the 3D printed part relative to each other. In some such examples, movement subsystem 140 may move sensor 110, post-processing component 120, and/or the 3D printed part when the marking is no longer detected. In examples, movement subsystem 140 may include any mechanical or electrical elements or component to move sensor 110, post-processing component 120, and/or the 3D printed part relative to each other. For example, movement subsystem 140 may include pulleys, belts, three-axis gimbaled mounting surfaces, etc. In some examples, movement subsystem 140 may be controlled by finishing engine 130 to determine when and where to actuate movement of sensor 110, post-processing component 120, and/or the 3D printed part. In other examples, other components or engines of system 100 may determine when and where to movement subsystem 140 is to move sensor 110, post-processing component 120, and/or the 3D printed part. In yet further examples, movement subsystem 140 may include hardware and/or processing resources to determine when and where to move sensor 110, post-processing component 120, and/or the 3D printed part.

In the example of FIG. 1B, post-processing component 120 may include a nozzle 125. In such examples, nozzle 125 may eject a fluid towards a 3D printed part. In some examples, nozzle 125 may be a plurality of nozzles to eject a fluid therefrom. In some examples, nozzle 125 may eject a pressurized fluid, such as air or other fluids containing abrasive particles or beads to remove a layer of material from the 3D printed part. In other examples, nozzle 125 may eject a coating to be deposited on a portion of the 3D printed part containing the marking. In other words, additional material layers may be deposited on the marking by nozzle 125. In yet another example, nozzle 125 may deliver a chemical to remove a material layer from the 3D printed part, such as an acid, a base, etc. In operation, the 3D printed part may be disposed such that sensor 110 may detect a marking on a portion of a 3D printed part facing nozzle 125. In one such example, movement subsystem 140 may move the 3D printed part relative to nozzle 125 when a marking is no longer detected. For example, movement subsystem 140 may move nozzle 125 to face a different location of the 3D printed part, move the 3D printed part, and combinations thereof. For example, movement subsystem 140 may move the 3D printed part to align with nozzle 125. In other examples, movement subsystem 140 may transport or move nozzle 125 to align with the 3D printed part. In yet other examples, movement subsystem 140 may move both the 3D printed part and the nozzle 125 of post-processing component 120. In other examples, a finishing component may include mechanisms without nozzles to remove or add a material layer from the 3D printed part. For example, a finishing component may be a sander, a saw, a laser, etc. to remove a layer from the 3D printed part.

In examples, in operation, system 100 may use sensor 110 to detect a marking on a portion of the 3D printed part. Finishing engine 130 may associate a finishing process with the identified marking and post-processing component 120 may perform the finishing operation on the portion of the 3D printed part including the marking while the marking is detected on the 3D printed part. In examples, finishing engine 130 may control post-processing component 120 to cease performing the finishing operation when sensor 110 fails to detect the marking on the 3D printed part. In an example, the detected marking may be a light in a certain UV range. In such an example, finishing engine 130 may determine the marking indicates an operation to remove a layer of material with a particular sandpaper grit size and post-processing component 120 may sand the 3D printed part using the identified sandpaper at a location indicated by the marking. When sensor 110 fails to detect any remaining light in the certain UV range being reflected from the 3D printed part or the detected strength of the detect UV light falls below a threshold, post-processing component 120 ceases operation. Movement subsystem 140 may then move sensor 110 and post-processing component 120 relative to the 3D printed part to sense a marking on a different portion of the 3D printed part. In an example, sensor 110 may detect a different marking at this location on the 3D printed part, such as a florescence color. Finishing engine 130 may determine the florescence color is associated with a material deposition operation to deposit TEFLON® at a certain thickness. In such an example, post-processing component 120 may include nozzle 125 to eject TEFLON® towards the portion of the 3D printed part including the detected florescence colored marking until the certain thickness is reached regardless of the continued detection of the florescence colored marking.

In another example, the marking may be a magnetic field detected by sensor 110. In such an example, sensor 110 may detect a magnitude and direction of a magnetic field emitted by the 3D printed part. In an example, system 100 may associate a material deposition finishing process with detecting via sensor 110 a magnetic field within a certain magnitude range. In one such example, the material to be deposited on the 3D printed part may be a gloss and post-processing component 120 may deposit the gloss on the portion of the 3D printed part containing the marking until sensor 110 no longer detects a magnetic field within the range. As will be appreciated, the addition of material layers, whether magnetized or non-magnetized, to a 3D printed part containing a magnetized particle may alter the strength of the detect magnetic field. In examples, system 100 may move the 3D printed part or post-processing component 120 to complete any additional finishing process when a second marking is detected by sensor 110. In examples, a system to detect marking on a 3D printed part indicating a finishing operation thereon may reduce or eliminate the use of skill and attention by a highly trained operator to finish a 3D printed part. Such example systems may allow for complex multi-step finishing operations to be performed on a 3D printed part with minimal to no user interaction.

Figure 2:
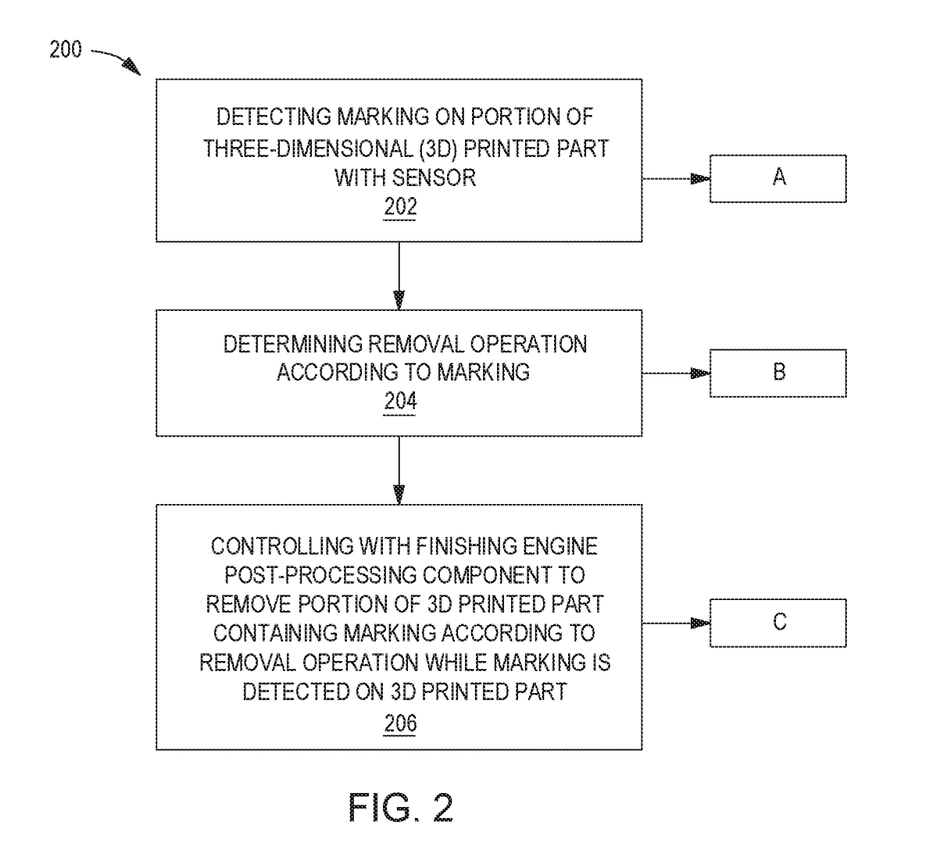
FIG. 2 is a flowchart of example methods for finishing a 3D printed part.

FIG. 2 is a flowchart of an example method 200 for finishing a 3D printed part. Although execution of method 200 is described below with reference to system 100 of FIGS. 1A-1B described above, other suitable systems for the execution of method 200 can be utilized. Additionally, implementation of method 200 is not limited to such examples.

At 202 of method 200, sensor 110 of system 100 may detect a marking on a portion of a 3D printed part. In examples, the marking may be a non-visible marking on an outer layer of a 3D printed part. In an example, the marking on the 3D printed part may be a fluorescent color which contrasts with the underlying portion of the 3D printed part under ultraviolet light. In another example, the marking on the 3D printed part may be an ultraviolet light, infrared light, or a higher level of magnetism. In other examples, the marking may be a visible marking on a 3D printed part. In examples, multiple different types of markings may be disposed on the 3D printed part. In such an example, sensor 110 may include multiple sensing components to detect each type of marking.

Figure 3:
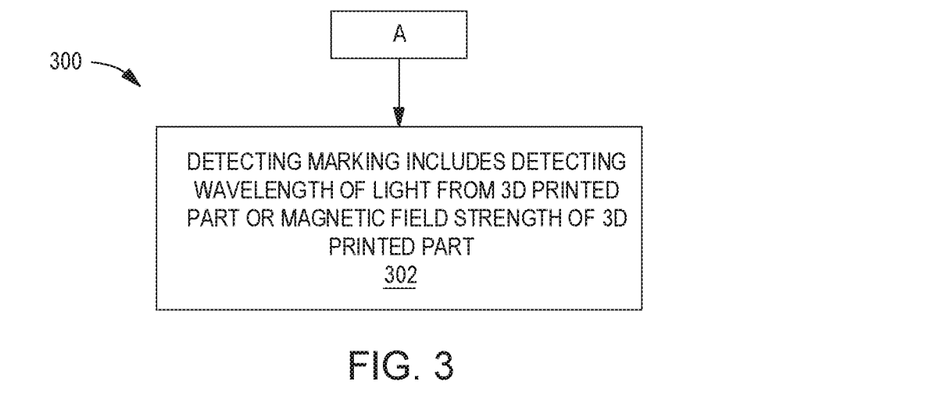
FIG. 3 is a flowchart of an example method for finishing a 3D printed part which may be incorporated into the flowchart of FIG. 2.

Referring now to FIG. 3, FIG. 3 is a flowchart of example a method for finishing a 3D printed part which may be incorporated into the flowchart of FIG. 2 at A. Although execution of the method of FIG. 3 is described below with reference to system 100 of FIGS. 1A-1B and the flowchart of FIG. 2 described above, other suitable systems for the execution of the method of FIG. 3 can be utilized. Additionally, implementation of the method of FIG. 3 is not limited to such examples. At 302 of method 300, sensor 110 may detect a wavelength of light from the 3D printed part or a magnetic field strength of the 3D printed part. In such an example, sensor 110 may include an optical sensor or a magnetic sensor. In examples, the magnetic sensor may also determine a direction of the magnetic field from the 3D printed part.

Figure 4A:
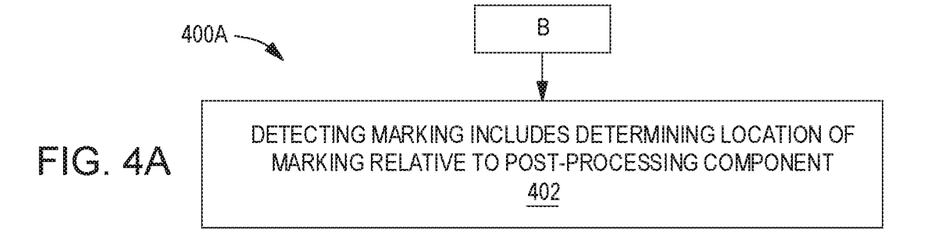
FIGS. 4A-B are flowcharts of example methods for finishing a 3D printed part which may be incorporated into the flowchart of FIG. 2.
Figure 4B:
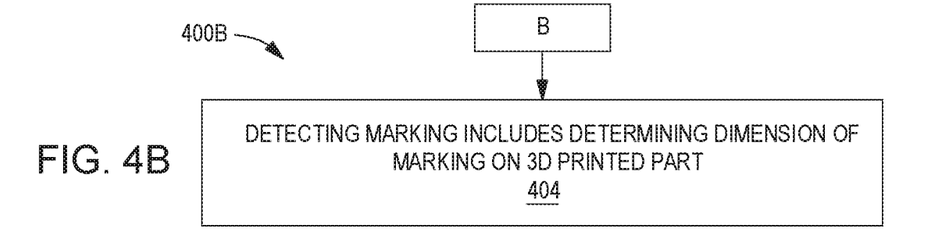

Referring again to FIG. 2, at 204, system 100 may determine a removal operation according to the marking. In some examples, finishing engine 130 may receive information to associate a marking with a removal operation from a remote device or system. In other examples, finishing engine 130 may receive information to associate a marking with a removal operation from a user interface coupled thereto. In yet other examples, finishing engine 130 may determine a marking is associated with a removal operation according to information, parameters, and/or criteria stored in system 100 or provided thereto. FIGS. 4A-4B are flowcharts of example methods for finishing a 3D printed part which may be incorporated into the flowchart of FIG. 2 at B. Although execution of the methods of FIGS. 4A-4B are described below with reference to system 100 of FIGS. 1A-1B and the flowchart of FIG. 2 described above, other suitable systems for the execution of the methods of FIGS. 4A-4B can be utilized. Additionally, implementation of the methods of FIGS. 4A-4B are not limited to such examples. At 402 of method 400A, system 100 may determine a location of the marking relative to the 3D printed part. In examples, sensor 110 may determine the location of the marking relative to the 3D printed part. In other examples, system 100 may include any hardware and/or processing resource to determine the location of the marking detected by sensor 110 relative to the 3D printed part. At 404 of method 400B, system 100 may determine a dimension of the marking on the 3D printed part. In examples, sensor 110 may determine the dimension of the marking on the 3D printed part. In other examples, system 100 may include any hardware and/or processing resource to determine the dimension of the marking detected by sensor 110.

At 206, finishing engine 130 may control post-processing component 120 to remove a portion of the 3D printed part containing the marking according to the removal operation while the marking is detected on the 3D printed part. In examples, the portion of the 3D printed part containing the marking may have a non-uniform thickness. In such examples, the use of sensor 110 to detect markings may allow post-processing component 120 to accurately remove the non-uniformly thick marking from the portion of the 3D printed part without the aid of a skilled operator.

Figure 5A:
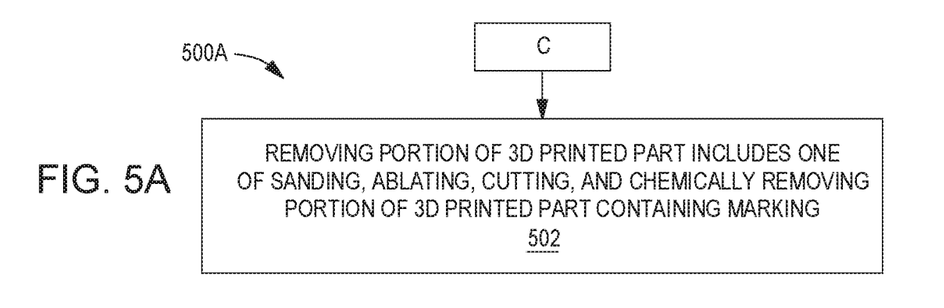
FIGS. 5A-5B are flowcharts of example methods for finishing a 3D printed part which may be incorporated into the flowchart of FIG. 2.

FIG. 5A is a flowchart of an example method 500A for finishing a 3D printed part which may be incorporated into the flowchart of FIG. 2 at C. Although execution of the method of FIG. 5A is described below with reference to system 100 of FIGS. 1A-1B and the flowchart of FIG. 2 described above, other suitable systems for the execution of the method of FIG. 5A can be utilized. Additionally, implementation of the method of FIG. 5A is not limited to such examples. At 502 of method 500A, the removal operation may be chosen from sanding, ablating, cutting, and chemically removing the portion of the 3D printed part containing the marking. In examples, "chemically removing" may refer to operations to use a chemical, such as an acid, a base, etc. to remove a portion of the 3D printed part. In such an example, the portion of the 3D printed part including the marking may be composed of a different build material from a build material of the underlying 3D printed part. In such an example, the portion of the 3D printed part including the marking may be composed of a different build which may be removed when exposed to a specific chemical without altering or removing the underlying build material of the 3D printed part.

Figure 5B:
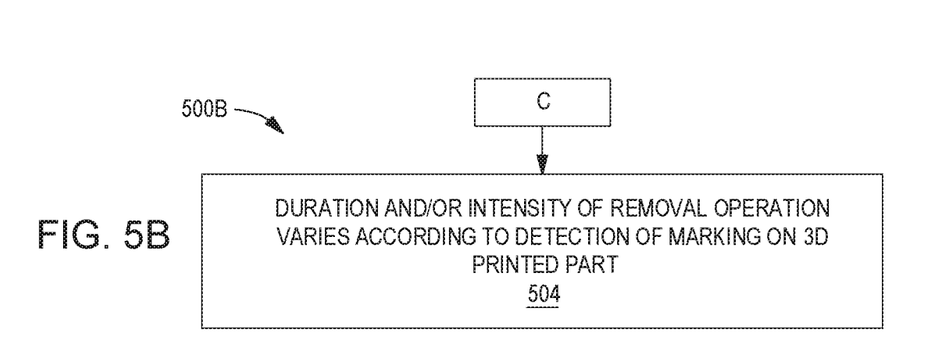

FIG. 5B is a flowchart of an example method 500B for finishing a 3D printed part which may be incorporated into the flowchart of FIG. 2 at C. Although execution of the method of FIG. 5B is described below with reference to system 100 of FIGS. 1A-1B and the flowchart of FIG. 2 described above, other suitable systems for the execution of the method of FIG. 5B can be utilized. Additionally, implementation of the method of FIG. 5B is not limited to such examples. At 504 of method 500B, finishing engine 130 may control post-processing component 120 such that a duration and/or intensity of the removal operation varies according to detection of the marking on the 3D printed part by sensor 110. For example, finishing engine 130 may control or alter an intensity of the removal operation to remove less build material when a strength of the signal detecting the marking on the 3D printed part is reduced. In such examples, the thickness of build material removed from a 3D printed part may vary.

Although the flowcharts of FIGS. 2-5B show a specific order of performance of certain functionalities, the flowcharts of FIGS. 2-5B are not limited to that order. For example, the functionalities shown in succession in a flowchart may be performed in a different order, may be executed concurrently or with partial concurrence, or a combination thereof. In some examples, functionalities described herein in relation to FIGS. 2-5B may be provided in combination with functionalities described herein in relation to any of FIGS. 1 and 6.

Figure 6:
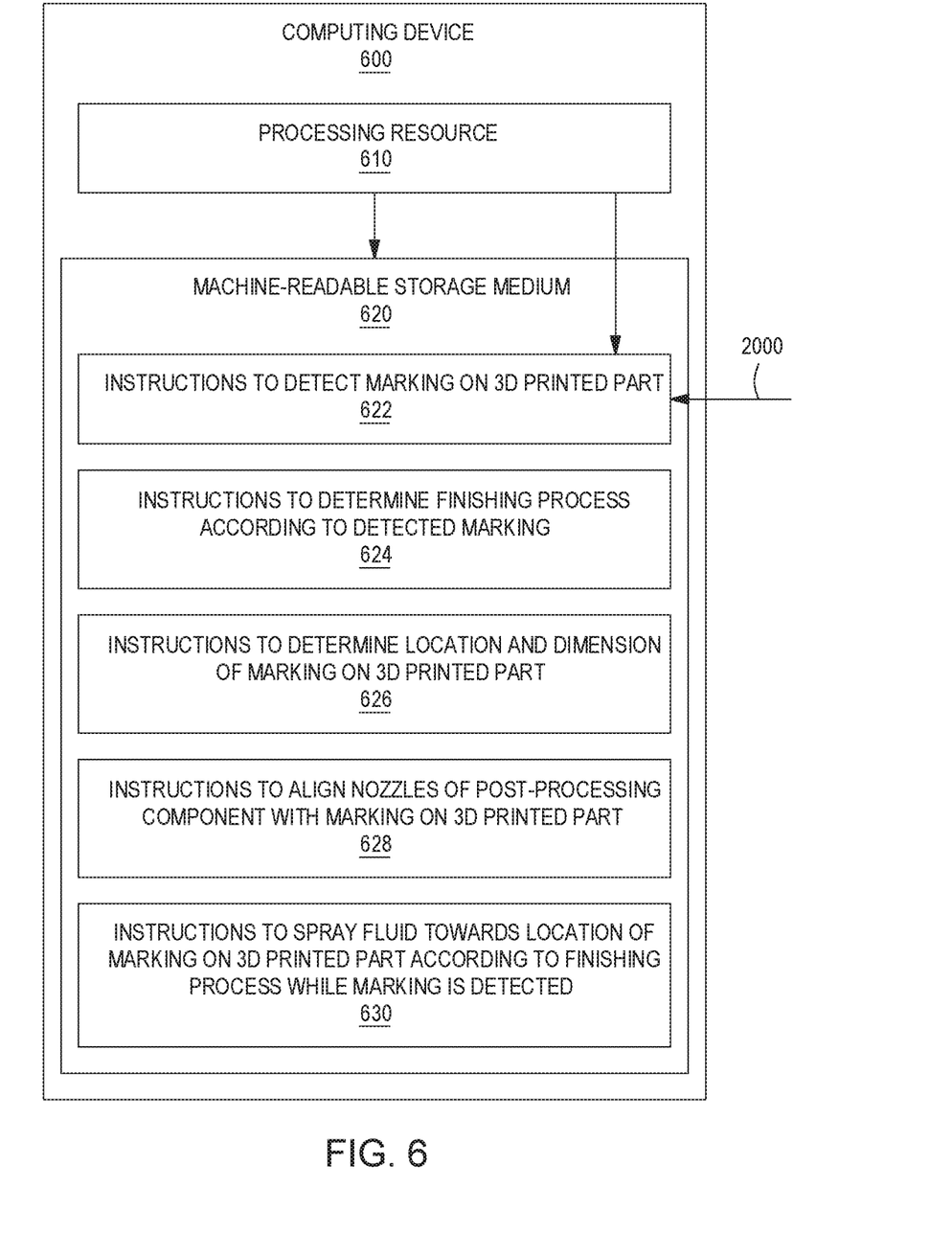
FIG. 6 is an example of a computing device to finish a 3D printed part.

FIG. 6 is a block diagram of an example computing device 600 to finish a 3D printed part. As used herein, a "computing device" refers to any electronic device including a processing resource, such as, a computer, a 2D printer, a 3D printer, a finishing device, such as a bead blasting apparatus, etc. In the example of FIG. 6, computing device 600 includes a processing resource 610 and a machine-readable storage medium 620 comprising (e.g., encoded with) instructions 622, 624, 626, 628, and 630 executable by processing resource 610. In some examples, storage medium 620 may include additional instructions. In some examples, instructions 622, 624, 626, 628, 630, and any other instructions described herein in relation to storage medium 620, may be stored on a machine-readable storage medium remote from but accessible to computing device 600 and processing resource 610 (e.g., via a computer network). In some examples, instructions 622, 624, 626, 628, and 630 may be instructions of a computer program, computer application (app), agent, or the like, of computing device 600. In other examples, the functionalities described herein in relation to instructions 622, 624, 626, 628, and 630 may be implemented as engines comprising any combination of hardware and programming to implement the functionalities of the engines, as described below.

In examples described herein, a "processing resource" may include, for example, one processor or multiple processors included in a single computing device (as shown in FIG. 6) or distributed across multiple computing devices. A "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution of instructions stored on a machine-readable storage medium, or a combination thereof. Processing resource 610 may fetch, decode, and execute instructions stored on storage medium 620 to perform the functionalities described below. In other examples, the functionalities of any of the instructions of storage medium 620 may be implemented in the form of electronic circuitry, in the form of executable instructions encoded on a machine-readable storage medium, or a combination thereof.

In the example of FIG. 6, instructions 622 may detect a marking 2000 on a 3D printed part. In examples, computing device 600 may receive information about mark 2000 from a sensor. The sensor may be substantially similar to sensor 110 described above with reference to FIGS. 1A-1B. In such examples, the sensor may be any type of sensor to detect marking 2000 on a 3D printed part. In examples, marking 2000 may be a physical property of a layer of the 3D printed part. As will be appreciate some physical properties may be visible to a user while other physical properties may be outside the visible perception of a user. For example, a non-visible physical property may be a fluorescent color that appears under UV light, a UV or near infrared (IR) color outside the normal visible spectrum, or a higher level of magnetism.

Instructions 624 may determine a finishing process according to the detected marking 2000. In examples, computing device 600 may determine a finishing process associate with marking 2000 according to information received from a remote device or system. In other examples, computing device 600 may determine or associate a finishing process with marking 2000 according to information received via a user interface coupled to computing device 600.

Instructions 626 may determine a location and dimension of marking 2000 on the 3D printed part. In examples, computing device 600 may determine the location and dimensions of marking 2000 according to information from a sensor to detect the marking. In other examples, computing device 600 may receive the location and/or dimensions of markings from a remote device or system. In yet other examples, computing device 600 may receive the location and/or dimensions of markings from a user interface coupled to computing device 600.

Instructions 628 may align nozzles of a post-processing component with marking 2000 on the 3D printed part. In examples, computing device 600 may cause actuation of a movement subsystem to align the nozzles of the post-processing components with the detected marking. For example, the movement subsystem may include moving the 3D printed part to align with stationary nozzles. In other examples, the movement subsystem may include transporting moveable nozzles to align with the 3D printed part. In yet other examples, the movement subsystem may include both moving the 3D printed part and the nozzles of the post-processing component.

Instructions 630 may spray a fluid towards the location of marking 2000 on the 3D printed part according to the finishing process while marking 2000 is detected. In some examples, the fluid may be a pressurized stream of air or other fluid containing small, abrasive particles or beads to perform a removal operation. In some examples, marking 2000 may have a non-uniform thickness. In such examples, the use of a sensor to detect marking 2000 may allow precise control of nozzles of a post-processing component to remove marking 2000 from the 3D printed part. In other examples, the fluid may contain a material to be added to the 3D printed part, such as a gloss or a protective material (e.g., TEFLON®).

In some examples, instructions 622, 624, 626, 628, and 630 may be part of an installation package that, when installed, may be executed by processing resource 610 to implement the functionalities described herein in relation to instructions 622, 624, 626, 628, and 630. In such examples, storage medium 620 may be a portable medium, such as a CD, DVD, flash drive, or a memory maintained by a computing device from which the installation package can be downloaded and installed. In other examples, instructions 622, 624, 626, 628, and 630 may be part of an application, applications, or component already installed on computing device 600 including processing resource 610. In such examples, the storage medium 620 may include memory such as a hard drive, solid state drive, or the like. In some examples, functionalities described herein in relation to FIG. 6 may be provided in combination with functionalities described herein in relation to any of FIGS. 1-5.

In the examples described herein, systems and methods for post-processing a 3D printed part including markings are described. The system includes a sensor to sense the markings and a post-processing component to perform a finishing operation(s) on the 3D printed part. In such examples, the markings on the 3D printed part may guide automated or semi-automated finishing operations. Such systems may advantageously allow for precise processing of 3D printed parts without the aid of a skilled operator. Such systems may also advantageously allow for multiple finishing operations to be performed on the same 3D printed part whether in the same location or different locations on the 3D printed part.

All of the features disclosed in this specification (including any accompanying claims, abstract and drawings), and/or all of the steps of any method or process so disclosed, may be combined in any combination, except combinations where at least some of such features and/or steps are mutually exclusive.

What is claimed is:

1. A system comprising:
    a three-dimensional (3D) printer;
    a post-processing component;
    a processor;
    a memory coupled to the processor and store instructions executable by the processor to:
        determine a finishing operation to be performed by the post-processing component on a portion of a part after the part has been 3D printed by the 3D printer;
        cause the part to be 3D printed by the 3D printer to include a marking on or in the portion that indicates the finishing operation that has been determined such that the marking has a fluorescent color having a brighter color under ultraviolet or near-infrared light than the portion or such that the marking has a magnetism different than a magnetism of the portion; and
    a sensor to optically or magnetically detect the marking on or in the portion of the part after the part has been 3D printed,
    wherein the instructions are executable by the processor to further, after the part has been 3D printed, and in response to the sensor detecting the marking:
        determine the finishing operation indicated by the marking;
        cause performance of the finishing operation by the post-processing component on at least the portion until the sensor no longer detects the marking on the portion,
    and wherein the finishing operation includes:
        ejection of a substance to remove material from at least the portion of the 3D printed part or to add material to at least the portion of the part;
        subjecting the part to a chemical bath deposition to add material to at least the portion of the part; or
        removal of material from at least the portion of the part.

2. The system of claim 1, further comprising a movement subsystem coupled to the processor, wherein the instructions are executable by the processor to further control the movement subsystem to move the sensor relative to the 3D printed part when the marking is no longer detected.

3. The system of claim 1, further comprising a movement subsystem coupled to the processor, wherein the instructions are executable by the processor to further control the movement subsystem to move the post-processing component relative to the 3D printed part when the marking is no longer detected.

4. The system of claim 1, wherein the marking is a physical property incorporated into a layer of the 3D printed part that distinguishes the layer from other layers of the 3D printed part.

5. The system of claim 1, wherein the marking is a physical property incorporated into the portion of a layer of the 3D printed part that distinguishes the portion of the layer from other portions of layers of the 3D printed part.

6. The system of claim 1, further comprising a movement subsystem coupled to the processor, wherein the instructions are executable by the processor to further control the movement subsystem to receive the 3D printed part built using an additive manufacturing process.

7. The system of claim 1, wherein the instructions are executable by the processor to further control an additive manufacturing process to build the marking on the portion of the 3D printed part.

8. The system of claim 1, wherein the marking is a first marking, the portion of the part is a first portion, and the sensor is to further detect a second marking on or in a second portion of the part, the system further comprising:

a gimbal on which the part is rotatably mounted,
wherein the instructions are executable by the processor to further:
  in response to the sensor no longer detecting the first marking on or in the first portion, such that the finishing operation on the first portion has been completed, rotate the 3D printed part; and
  after rotation of the 3D printed part, and in response to the sensor detecting the second marking, cause performance of the finishing operation by the post-processing component on at least the second portion until the sensor no longer detects the second marking.

9. The system of claim 1, wherein the finishing operation includes ejection of the substance to add the material to at least the portion to cover the portion.

10. The system of claim 1, wherein the finishing operation includes subjecting the part to the chemical bath deposition to add the material to at least the portion of the part.

11. The system of claim 1, wherein the part is caused to be 3D printed to include the marking such that the marking has the fluorescent color having the brighter color under the ultraviolet or the near-infrared light than the portion.

12. The system of claim 1, wherein the part is caused to be 3D printed to include the marking such that the marking has the magnetism different than the magnetism of the portion.

* * * * *